(12) United States Patent
Chen et al.

(10) Patent No.: US 11,176,469 B2
(45) Date of Patent: Nov. 16, 2021

(54) MODEL TRAINING METHODS, APPARATUSES, AND SYSTEMS

(71) Applicant: Advanced New Technologies Co., Ltd., George Town (KY)

(72) Inventors: Chaochao Chen, Hangzhou (CN); Liang Li, Hangzhou (CN); Jun Zhou, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/244,811

(22) Filed: Apr. 29, 2021

(65) Prior Publication Data

US 2021/0248499 A1 Aug. 12, 2021

Related U.S. Application Data

(63) Continuation of application No. PCT/CN2019/130091, filed on Dec. 30, 2019.

(30) Foreign Application Priority Data

Feb. 1, 2019 (CN) .......................... 201910103212.5

(51) Int. Cl.
*G06N 5/04* (2006.01)
*G06N 20/00* (2019.01)

(52) U.S. Cl.
CPC ............... *G06N 5/04* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS

2017/0213156 A1 7/2017 Hammond et al.
2018/0300630 A1 10/2018 Andoni et al.
(Continued)

FOREIGN PATENT DOCUMENTS

CN 106649597 5/2017
CN 107169573 9/2017
(Continued)

OTHER PUBLICATIONS

C. Sun, M. Ma, Z. Zhao, S. Tian, R. Yan and X. Chen, "Deep Transfer Learning Based on Sparse Autoencoder for Remaining Useful Life Prediction of Tool in Manufacturing," in IEEE Transactions on Industrial Informatics, vol. 15, No. 4, pp. 2416-2425, Apr. 2019, doi: 10.1109/TII.2018.2881543. (Year: 2018).*
(Continued)

*Primary Examiner* — Alexey Shmatov
*Assistant Examiner* — Ahsif A. Sheikh
(74) *Attorney, Agent, or Firm* — Fish & Richardson P.C.

(57) ABSTRACT

A first training participant performs an iterative process until a predetermined condition is satisfied, where the iterative process includes: obtaining, using secret sharing matrix addition and based on the current sub-model of each training participant and a corresponding feature sample subset of each training participant, a current prediction value of the regression model for a feature sample set, where the corresponding feature sample subset of each training participant is obtained by performing vertical segmentation on the feature sample set; determining a prediction difference between the current prediction value and a label corresponding to the current prediction value; sending the prediction difference to each second training participant; and updating a current sub-model of the first training participant based on the current sub-model of the first training participant and a
(Continued)

product of a corresponding feature sample subset of the first training participant and the prediction difference.

20 Claims, 8 Drawing Sheets

(56) References Cited

U.S. PATENT DOCUMENTS

| | | | |
|---|---|---|---|
| 2018/0307945 A1 | 10/2018 | Haigh et al. | |
| 2020/0242466 A1* | 7/2020 | Mohassel | G06F 21/6254 |

FOREIGN PATENT DOCUMENTS

| | | |
|---|---|---|
| CN | 107463996 | 12/2017 |
| CN | 2018057203 | 3/2018 |
| CN | 107992906 | 5/2018 |
| CN | 108427939 | 8/2018 |
| CN | 108431549 | 8/2018 |
| CN | 109002861 | 12/2018 |
| CN | 109214193 | 1/2019 |

OTHER PUBLICATIONS

Indrakanti, Sesha Pallavi, and P. S. Avadhani. "Privacy Preserving through Segment-Based Visual Cryptography." Advanced Computing 3.4 (2012): 95. (Year: 2012).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/130091, dated Mar. 26, 2020, 9 pages (with partial English translation).

Casalino et al., "Learning to Connect: a Training Model for Public Sector on Advanced E-Government Services and Inter-Organizational Cooperation," International Journal of Advanced Corporate Learning; Vienna, Feb. 15, 2014, 7(1):24-31.

Liu et al., "Research of Mutual Learning Neural Networking Training Method," Chinese Journal of Computers, Mar. 31, 2017, 40(6):19 pages (with English abstract).

Yang et al., "Reliability-based design optimization with cooperation between support vector machine and particle swarm optimization," Engineering with Computers, Jan. 11, 2012, 29(2):151-163.

* cited by examiner

MODEL TRAINING METHODS, APPARATUSES, AND SYSTEMS

CROSS-REFERENCE TO RELATED APPLICATIONS

This application is a continuation of PCT Application No. PCT/CN2019/130091, filed on Dec. 30, 2019, which claims priority to Chinese Patent Application No. 201910103212.5, filed on Feb. 1, 2019, and each application is hereby incorporated by reference in its entirety.

TECHNICAL FIELD

The present disclosure generally relates to the field of machine learning, and in particular to methods, apparatuses, and systems for collaboratively training a linear/logistic regression model by a plurality of training participants using a vertically segmented training set.

BACKGROUND

Linear regression models and logistic regression models are widely used regression/classification models in machine learning. In many cases, a plurality of model training participants (e.g., e-commerce companies, courier services companies, and banks) each have different portions of data of feature samples used for training a linear/logistic regression model. The plurality of model training participants generally want to use each other's data together to train the linear/logistic regression model in a unified way, but do not want to provide their respective data to other model training participants in order to prevent their own data from being leaked.

In view of this, a machine learning method that can protect data security is proposed. In the machine learning method, data security of each of the plurality of model training participants is ensured, and the plurality of model training participants can collaboratively train the linear/logistic regression model for their own use. However, model training efficiency of an existing machine learning method that can protect data security is relatively low.

SUMMARY

In view of the above problems, the present disclosure provides methods, apparatuses, and systems for collaboratively training linear/logistic regression models by a plurality of training participants, which can improve model training efficiency while ensuring respective data security of the plurality of training participants.

According to an aspect of the present disclosure, a method for collaboratively training a linear/logistic regression model by a plurality of training participants is provided, where the linear/logistic regression model includes a plurality of sub-models, each training participant has a sub-model, the training participants include a first training participant having a label and at least two second training participants not having a label, the method is performed by the first training participant, and the method includes: performing the following iterative process until a predetermined condition is satisfied: using secret sharing matrix addition based on a current sub-model of each training participant and a corresponding feature sample subset to obtain a current prediction value of the linear/logistic regression model for a feature sample set, where the feature sample subset is obtained by performing vertical segmentation on the feature sample set; determining a prediction difference between the current prediction value and a corresponding label; sending the prediction difference to each second training participant, so at each second training participant, a current sub-model of the second training participant is updated based on the current sub-model of the second training participant and a product of a corresponding feature sample subset and the prediction difference; and updating a current sub-model of the first training participant based on the current sub-model of the first training participant and a product of a corresponding feature sample subset and the prediction difference; where when the iterative process does not end, the updated current sub-model of each training participant is used as a current sub-model of a next iterative process.

According to another aspect of the present disclosure, a method for collaboratively training a linear/logistic regression model by a plurality of training participants is provided, where the linear/logistic regression model includes a plurality of sub-models, each training participant has a sub-model, the training participants include a first training participant having a label and at least two second training participants not having a label, the method is performed by the second training participant, and the method includes: performing the following iterative process until a predetermined condition is satisfied: using secret sharing matrix addition based on a current sub-model of each training participant and a corresponding feature sample subset to obtain a current prediction value of the linear/logistic regression model for a feature sample set, where the feature sample subset is obtained by performing vertical segmentation on the feature sample set; receiving a prediction difference from the first training participant, where the prediction difference is determined at the first training participant based on the current prediction value of the feature sample set and a corresponding label; and updating a current sub-model of the second training participant based on the current sub-model of the second training participant and a product of a corresponding feature sample subset and the prediction difference, where when the iterative process does not end, the updated current sub-model of each training participant is used as a current sub-model of a next training iterative process.

According to another aspect of the present disclosure, a method for collaboratively training a linear/logistic regression model by a plurality of training participants is provided, where the linear/logistic regression model includes a plurality of sub-models, each training participant has a sub-model, the training participants include a first training participant having a label and at least two second training participants not having a label, and the method includes: performing the following iterative process until a predetermined condition is satisfied: using secret sharing matrix addition based on a current sub-model of each training participant and a corresponding feature sample subset to obtain a current prediction value of the linear/logistic regression model for a feature sample set, where the feature sample subset is obtained by performing vertical segmentation on the feature sample set; determining a prediction difference between the current prediction value of the feature sample set and a corresponding label at the first training participant, and separately sending the prediction difference to each second training participant; and at each training participant, updating a current sub-model of the training participant based on the current sub-model of the training participant and a product of a corresponding feature sample subset and the prediction difference, where when the iterative process does not end, the updated current sub-model of each training participant is used as a current sub-model of a next iterative process.

According to another aspect of the present disclosure, an apparatus for collaboratively training a linear/logistic regression model by a plurality of training participants is provided, where the linear/logistic regression model includes a plurality of sub-models, each training participant has a sub-model, the training participants include a first training participant having a label and at least two second training participants not having a label, and the apparatus includes: a prediction value acquisition unit, configured to use secret sharing matrix addition based on a current sub-model of each training participant and a corresponding feature sample subset to obtain a current prediction value of the linear/logistic regression model for a feature sample set, where the feature sample subset is obtained by performing vertical segmentation on the feature sample set; a prediction difference determining unit, configured to determine a prediction difference between the current prediction value of the feature sample set and a corresponding label; a prediction difference sending unit, configured to send the prediction difference to each second training participant, so at each second training participant, a current sub-model of the second training participant is updated based on the current sub-model of the second training participant and a product of a corresponding feature sample subset and the prediction difference; and a model updating unit, configured to update a current sub-model of the first training participant based on the current sub-model of the first training participant and a product of a corresponding feature sample subset and the prediction difference, where when an iterative process does not end, the updated current sub-model of each training participant is used as a current sub-model of a next iterative process; where the prediction value acquisition unit, the prediction difference determining unit, the prediction difference sending unit, and the model updating unit are configured to perform an operation cyclically until a predetermined condition is satisfied.

According to another aspect of the present disclosure, an apparatus for collaboratively training a linear/logistic regression model by a plurality of training participants is provided, where the linear/logistic regression model includes a plurality of sub-models, each training participant has a sub-model, the training participants include a first training participant having a label and at least two second training participants not having a label, and the apparatus includes: a prediction value acquisition unit, configured to use secret sharing matrix addition based on a current sub-model of each training participant and a corresponding feature sample subset to obtain a current prediction value of the linear/logistic regression model for a feature sample set, where the feature sample subset is obtained by performing vertical segmentation on the feature sample set; a prediction difference receiving unit, configured to receive a prediction difference from the first training participant, where the prediction difference is determined at the first training participant based on the current prediction value of the feature sample set and a corresponding label; and a model updating unit, configured to update a current sub-model of the second training participant based on the current sub-model of the second training participant and a product of a corresponding feature sample subset and the prediction difference, where when the iterative process does not end, the updated current sub-model of each training participant is used as a current sub-model of a next training iterative process; where the prediction value acquisition unit, the prediction difference receiving unit, and the model updating unit are configured to perform an operation cyclically until a predetermined condition is satisfied.

According to another aspect of the present disclosure, a system for collaboratively training a linear/logistic regression model by a plurality of training participants is provided, where the linear/logistic regression model includes a plurality of sub-models, each training participant has a sub-model, the training participants include a first training participant having a label and at least two second training participants not having a label, and the system includes: a first training participant device, including the apparatus for collaboratively training a linear/logistic regression model by a plurality of training participants as described above; and at least two second training participant devices, where each second training participant device includes the apparatus for collaboratively training a linear/logistic regression model by a plurality of training participants as described above.

According to another aspect of the present disclosure, a computing device is provided, including: at least one processor; and a memory coupled to the at least one processor, where the memory stores instructions, and when the instructions are executed by the at least one processor, the at least one processor performs the training method performed on the first training participant as described above.

According to another aspect of the present disclosure, a non-transitory machine readable storage medium on which executable instructions are stored is provided, where when being executed, the instructions cause the at least one processor to perform the training method performed on the first training participant as described above.

According to another aspect of the present disclosure, a computing device is provided, including at least one processor and a memory coupled to the at least one processor, where the memory stores instructions, and when the instructions are executed by the at least one processor, the at least one processor performs the training method performed on the second training participant as described above.

According to another aspect of the present disclosure, a non-transitory machine readable storage medium on which executable instructions are stored is provided, where when being executed, the instructions cause at least one processor to perform the training method performed on the second training participant as described above.

In the solutions of the embodiments of the present disclosure, secret sharing matrix addition is used to collaboratively train a linear/logistic regression model by a plurality of training participants, so model parameters of the linear/logistic regression model can be obtained through training without leaking secret data of the plurality of training participants. In addition, a workload of model training is only in a linear relationship with a quantity of feature samples used for training, rather than an exponential relationship. Therefore, compared with the existing technology, the solutions of the embodiments of the present disclosure can improve model training efficiency while ensuring respective data security of the plurality of training participants.

BRIEF DESCRIPTION OF DRAWINGS

Further understanding of the essence and advantages of the present disclosure can be realized by referring to the following accompanying drawings. In the accompanying drawings, similar components or features can have the same reference numerals.

DESCRIPTION OF EMBODIMENTS

Figure 1:
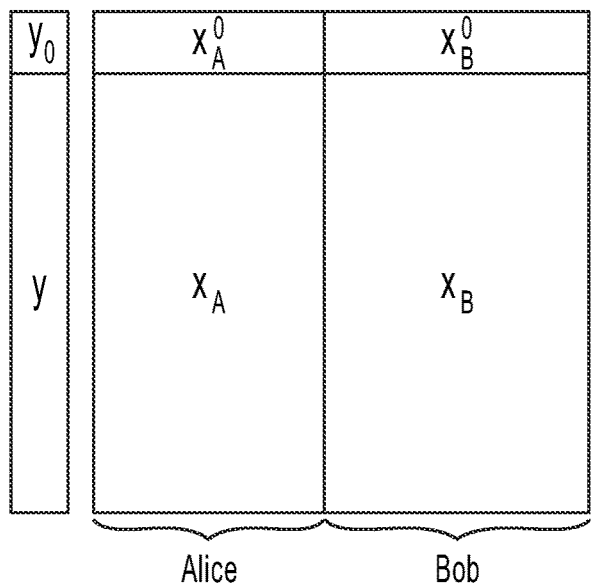
FIG. 1 shows a schematic diagram of an example of vertically segmented data according to one or more embodiments of the present disclosure.

The subject matter described here will be discussed below with reference to example implementations. It should be understood that these implementations are merely discussed to enable a person skilled in the art to better understand and implement the subject matter described in the present specification, and are not intended to limit the protection scope, applicability, or examples described in the claims. The functions and arrangements of the elements under discussion can be changed without departing from the protection scope of the present disclosure. Various processes or components can be omitted, replaced, or added in the examples as needed. For example, the described method can be performed in a different order from the described sequence, and steps can be added, omitted, or combined. In addition, features described for some examples can also be combined in other examples.

As used in the present specification, the term "include" and its variants are inclusive, meaning "including but not limited to". The term "based on" means "based on at least a part". The terms "one embodiment" and "an embodiment" indicate "at least one embodiment". The term "another embodiment" indicates "at least one other embodiment". The terms "first", "second", etc. can refer to different objects or the same object. The following can include other definitions, whether explicit or implicit. Unless explicitly stated in the context, the definition of a term is consistent throughout the present specification.

A secret sharing method is a cryptographic technology that divides a secret for storage, and the secret is properly divided into a plurality of secret shares. Each secret share is owned and managed by one participant of a plurality of participants. A single participant cannot recover a complete secret. The complete secret can be recovered only through collaboration by several participants. The purpose of the secret sharing method is to prevent concentration of secrets in order to distribute risks and tolerate intrusions.

Secret sharing matrix addition is a secret sharing method. With secret sharing matrix addition, each of a plurality of participants with their respective secret shares generates and discloses a value different from a secret share it owns, but a sum of values disclosed by the plurality of participants is equal to a sum of the secret shares they own (i.e., a complete secret). Therefore, the plurality of participants can cooperate to recover the complete secret by using secret sharing matrix addition without disclosing the secret shares owned by the plurality of participants. This ensures data security of the plurality of participants. In a case where a complete secret is split into only two secret shares owned separately by two participants, if secret sharing matrix addition is used to recover the complete secret, each participant of the two participants can easily deduce the secret share owned by the other participants. Therefore, secret sharing matrix addition is only applicable to a case where a complete secret is split into at least three secret shares owned separately by at least three participants.

In the present disclosure, a training sample set used in a linear/logistic regression model training solution is a vertically segmented training sample set. The term "vertical segmentation on the training sample set" refers to segmenting the training sample set into a plurality of training sample subsets by module/function (or a specified rule), where each training sample subset includes one or more training sub-samples of each training sample in the training sample set, and one or more training sub-samples included in all training sample subsets constitute the training sample. In an example, assuming that a training sample includes label $Y_0$ and attributes $X_A^0$ and $X_B^0$, after vertical segmentation, training participant Alice has $Y_0$ and $X_A^0$ of the training sample, and training participant Bob has $X_B^0$ of the training sample. In another example, assuming that a training sample includes label $Y_0$ and attributes $X_A^0$, $X_B^0$ and $X_C^0$, after vertical segmentation, training participant Alice has $Y_0$, $X_A^0$, and $X_B^0$ of the training sample, and training participant Bob has $X_B^0$ and $X_C^0$ of the training sample. In addition to these two examples, there are other possible cases, which are not listed here one by one.

Assuming that an example of an attribute value sample $x^T=(x1; x2; \ldots; xd)$ described by d attributes (also referred to as features) is given, where $x_i$ is a value of x on the $i^{th}$ attribute and T represents transpose, then a linear regression model is $Y=Wx$ and a logistic regression model is $Y=1/(1+e^{-wx})$, where Y is a prediction value, W is a model parameter of the linear/logistic regression model (i.e., the model described in the present disclosure), $$W = \sum_P W_P,$$

and $W_P$ refers to a sub-model at each participant P in the present disclosure. In the present disclosure, the attribute value sample is also referred to as a feature data sample.

In the present disclosure, each training participant has a different portion of data of the training sample used for training the linear/logistic regression model. For example, two training participants are used as an example. Assuming that attaining sample set includes 100 training samples, and each training sample includes a plurality of feature values and a label, data owned by the first participant can be one or more feature values and the label of each training sample in the 100 training samples, and data owned by the second participant can be one or more feature values (for example, the remaining feature values) of each training sample in the 100 training samples.

Whether to transpose one or more corresponding matrices in two or more matrices involved in a matrix multiplication needs to be determined, according to actual conditions, for matrix multiplication calculation described anywhere in the present disclosure, so as to satisfy a matrix multiplication rule and complete the matrix multiplication calculation.

The following describes in detail, with reference to the accompanying drawings, embodiments of methods, apparatuses, and systems for collaboratively training a linear/logistic regression model by a plurality of training participants according to the present disclosure.

FIG. 1 shows a schematic diagram of an example of a vertically segmented training sample set according to one or more embodiments of the present disclosure. FIG. 1 shows two data parties Alice and Bob, and the case is similar for a plurality of data parties. Each of data parties Alice and Bob has one or more training sub-samples of each training sample in all training samples in the training sample set. For each training sample, a combination of the training sub-samples owned by data parties Alice and Bob can constitute complete content of the training sample. For example, assuming that content of a certain training sample includes label $Y_0$ and attribute features $X_A^0$ and $X_B^0$, after vertical segmentation, training participant Alice has $Y_0$ and $X_A^0$ of the training sample, and training participant Bob has $X_B^0$ of the training sample.

Figure 2:
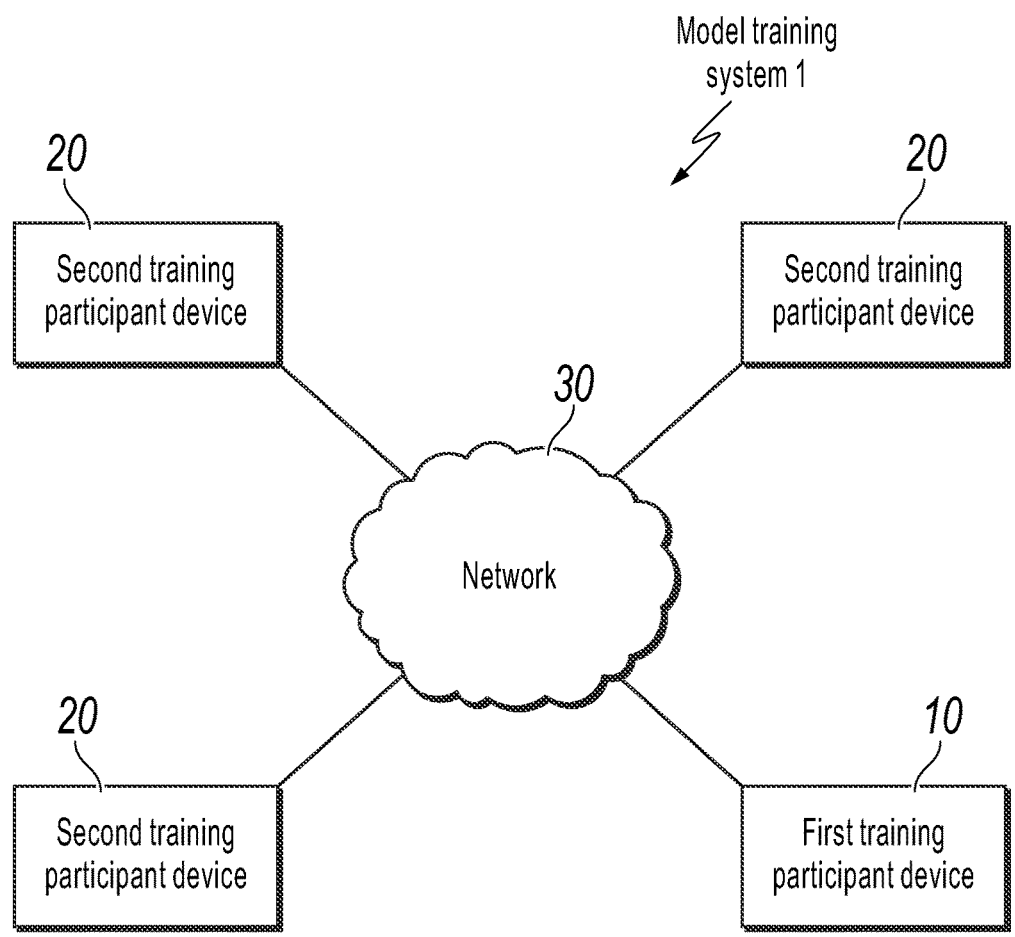
FIG. 2 shows a schematic architectural diagram of a system for collaboratively training a linear/logistic regression model by a plurality of training participants according to one or more embodiments of the present disclosure.

FIG. 2 shows a schematic architectural diagram of a system 1 (hereinafter "model training system 1") for collaboratively training a linear/logistic regression model by a plurality of training participants according to one or more embodiments of the present disclosure.

As shown in FIG. 2, the model training system 1 includes a first training participant device 10 and at least two second training participant devices 20. FIG. 2 shows three second training participant devices 20. In other embodiments of the present disclosure, there can be two second training participant devices 20 or more than three second training participant devices 20. The first training participant device 10 and the at least two second training participant devices 20 can communicate with each other by using a network 30, such as, but not limited to, the Internet or a local area network. In the present disclosure, the first training participant device 10 and the at least two second training participant devices 20 are all referred to as training participant devices. The first training participant device 10 has label data (that is, a value of a label), and the second training participant device 20 does not have label data.

In the present disclosure, the trained linear/logistic regression model is segmented into a first quantity of sub-models. Here, the first quantity is equal to a quantity of training participant devices that participate in model training. Here, assuming that the quantity of training participant devices is N. Accordingly, the linear/logistic regression model is segmented into N sub-models, and each training participant device has one sub-model. A training sample set used for model training is located at the first training participant device 10 and the at least two second training participant devices 20. The training sample set is the vertically segmented training sample set described above, and the training sample set includes a feature dataset and corresponding labels, that is, $X_0$ and $Y_0$ shown in FIG. 1. A sub-model owned by each training participant and a corresponding training sample are secrets of the training participants, and cannot be determined or completely determined by other training participants.

In the present disclosure, the linear/logistic regression model and the sub-model of each training participant are represented by weight vector W and weight sub-vector Wi, respectively, where i is used to represent a sequence number of the training participant. The feature dataset is represented by feature matrix X. The prediction value and the label are represented by prediction value vector $\tilde{Y}$ and label vector Y, respectively.

During model training, the first training participant device 10 and the at least two second training participant devices 20 jointly perform secret sharing matrix addition by using respective training sample subsets and respective sub-models, so as to obtain a prediction value for the training sample set, thereby collaboratively training the linear/logistic regression model. A specific training process of the model is described in detail below with reference to FIG. 3 and FIG. 4.

In the present disclosure, the first training participant device 10 and the second training participant device 20 can be any suitable computing devices having a computing capability. The computing device includes but is not limited to a personal computer, a server computer, a workstation, a desktop computer, a laptop computer, a notebook computer, a mobile computing device, a smartphone, a tablet computer, a cellular phone, a personal digital assistant (PDA), a handheld apparatus, a message transceiver device, a wearable computing device, a consumer electronic device, etc.

Figure 3:
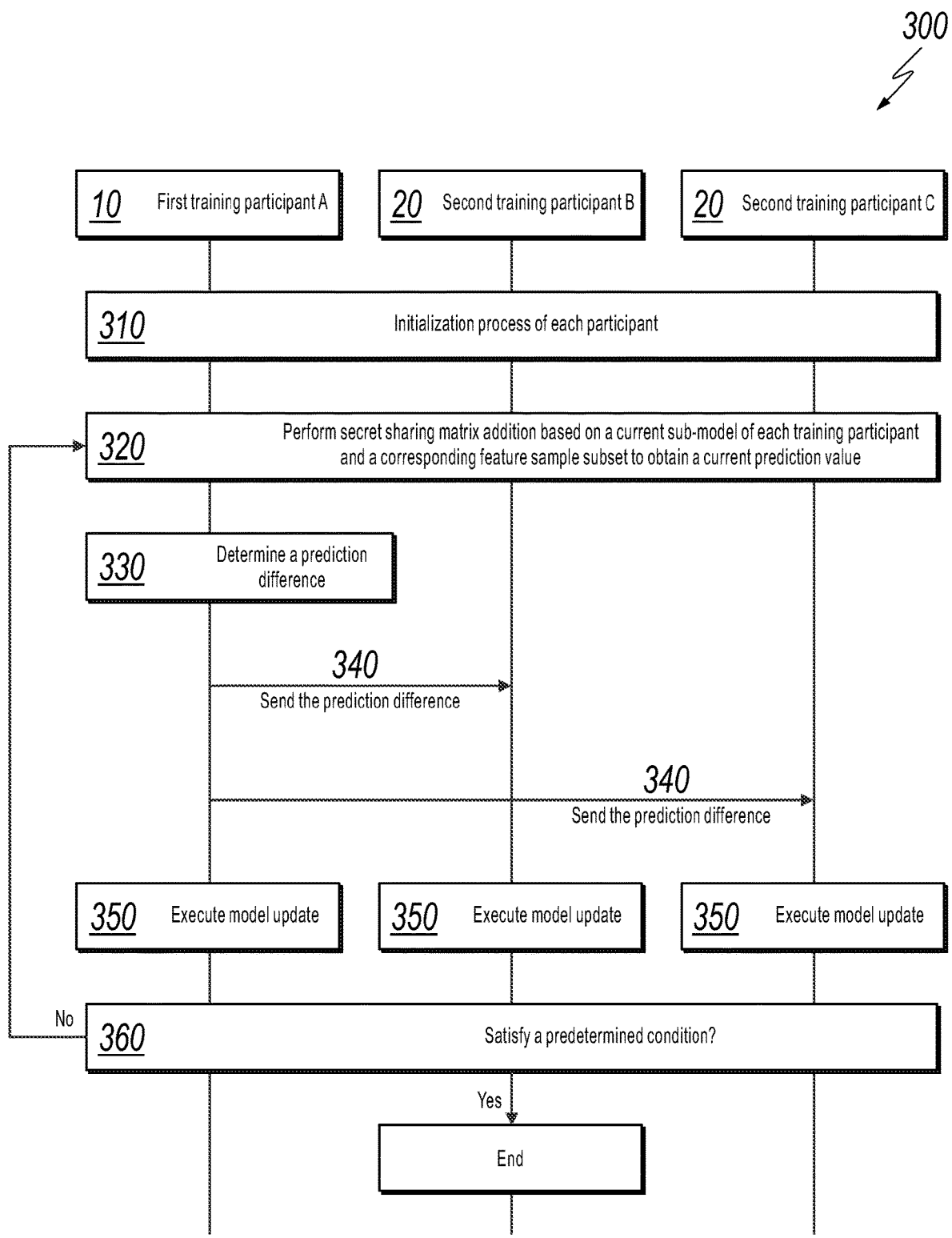
FIG. 3 shows an overall flowchart of a method for collaboratively training a linear/logistic regression model by a plurality of training participants according to one or more embodiments of the present disclosure.

FIG. 3 shows an overall flowchart of a method for collaboratively training a linear/logistic regression model by a plurality of training participants according to one or more embodiments of the present disclosure. In FIG. 3, one first training participant Alice and two second training participants Bob and Charlie are used as an example for description.

As shown in FIG. 3, first, at block 310, first training participant Alice and second training participants Bob and Charlie initialize sub-model parameters of their sub-models, that is, $W_A$, $W_B$, and $W_C$, to obtain initial values of their sub-model parameters, and initialize a quantity t of executed training iterations to zero. Here, assuming that an end condition of an iterative process is execution of a predetermined quantity of training iterations, for example, T training iterations.

After the above initialization, at block 320, secret sharing matrix addition based on current sub-models $W_A$, $W_B$, and of each training participant and their respective feature sample subsets $X_A$, $X_B$, and $X_C$ is used to obtain a current prediction value $\tilde{Y}$ of a linear/logistic regression model to be trained for feature sample set X. How to obtain current prediction value $\tilde{Y}$ of the linear/logistic regression model to be trained for feature sample set X by using secret sharing matrix addition is described below with reference to FIG. 4.

After current prediction value $\tilde{Y}$ is obtained, at block 330, prediction difference $e=Y-\tilde{Y}$ between current prediction value $\tilde{Y}$ and corresponding label Y is determined at first training participant Alice. Here, e is a column vector, Y is a column vector representing a label of training sample X, and $\tilde{Y}$ is a column vector representing the current prediction value of training sample X. If training sample X contains only a single training sample, e, Y, and $\tilde{Y}$ all are column vectors with only a single element. If training sample X includes a plurality of training samples, e, Y, and $\tilde{Y}$ all are column vectors having a plurality of elements, where each element in $\tilde{Y}$ is a current prediction value of a corresponding training sample in the plurality of training samples, each element in Y is a label of the corresponding training sample in the plurality of training samples, and each element in e is a difference between the label of the corresponding training sample in the plurality of training samples and the current prediction value.

Then, at block 340, the determined prediction difference e is separately sent to each of second training participants Bob and Charlie.

Then, at block 350, at each training participant, a current sub-model at the training participant is updated based on the current sub-model of the training participant and a product of prediction difference e and a feature sample subset of the training participant. For example, first training participant Alice updates a current sub-model at first training participant Alice by using current sub-model $W_A$ and a product of prediction difference e and feature sample set $X_A$, second training participant Bob updates a current sub-model at second training participant Bob by using current sub-model $W_B$ and a product of prediction difference e and feature sample set $X_B$, and second training participant Charlie updates a current sub-model at second training participant Charlie by using current sub-model $W_C$ and a product of prediction difference e and feature sample set $X_C$.

In an example of the present disclosure, the updating a current sub-model at the training participant based on the current sub-model of the training participant and a product of the prediction difference and a feature sample subset of the training participant can include updating the current sub-model at the training participant based on the following equation: $W_{n+1} = W_n - \alpha \cdot X_i \cdot e$, where $W_{n+1}$ represents the updated current sub-model at the training participant, $W_n$ represents the current sub-model at the training participant, α represents a learning rate (learning rate), $X_i$ represents the feature sample subset at the training participant, and e represents the prediction difference. It should be noted here that when $X_i$ is a single feature sample, $X_i$ is a feature vector (a column vector or a row vector) including a plurality of attributes, and e is a single prediction difference. When $X_i$ is a plurality of feature samples, $X_i$ is a feature matrix, an attribute of each feature sample forms one column of elements/one row of elements of feature matrix $X_i$, and e is a prediction difference vector. During calculation of $X_i \cdot e$, a feature value of each sample corresponding to a certain feature of matrix $X_i$ is multiplied by each element in e. For example, assuming that e is a column vector, during multiplication each time, e is multiplied by one row in matrix $X_i$, and an element in the row represents a feature value of a certain feature corresponding to each sample.

After each training participant completes the sub-model update of the training participant as described above, at block 360, whether a predetermined quantity of iterations is reached is determined, that is, whether a predetermined condition is reached is determined. If the predetermined quantity of iterations is reached, each training participant stores a current updated value of a sub-model parameter of the training participant as a final value of the sub-model parameter of the training participant, so as to obtain a trained sub-model of the training participant, and then the process ends. If the predetermined quantity of iterations is not reached, the process returns to the operation of block 320 to perform a next training iterative process, and the updated current sub-model obtained by each training participant in the current iterative process is used as a current sub-model of the next training iterative process.

It should be noted here that in the previous example, the end condition of the training iterative process means that the predetermined quantity of iteration times is reached. In another example of the present disclosure, the end condition of the training iterative process can also be that the determined prediction difference is within a predetermined range, that is, each element $e^i$ in prediction difference e is within the predetermined range, for example, each element $e_i$ in prediction difference e is less than a predetermined threshold. Accordingly, the operation of block 360 in FIG. 3 can be performed after the operation of block 320.

Figure 4:
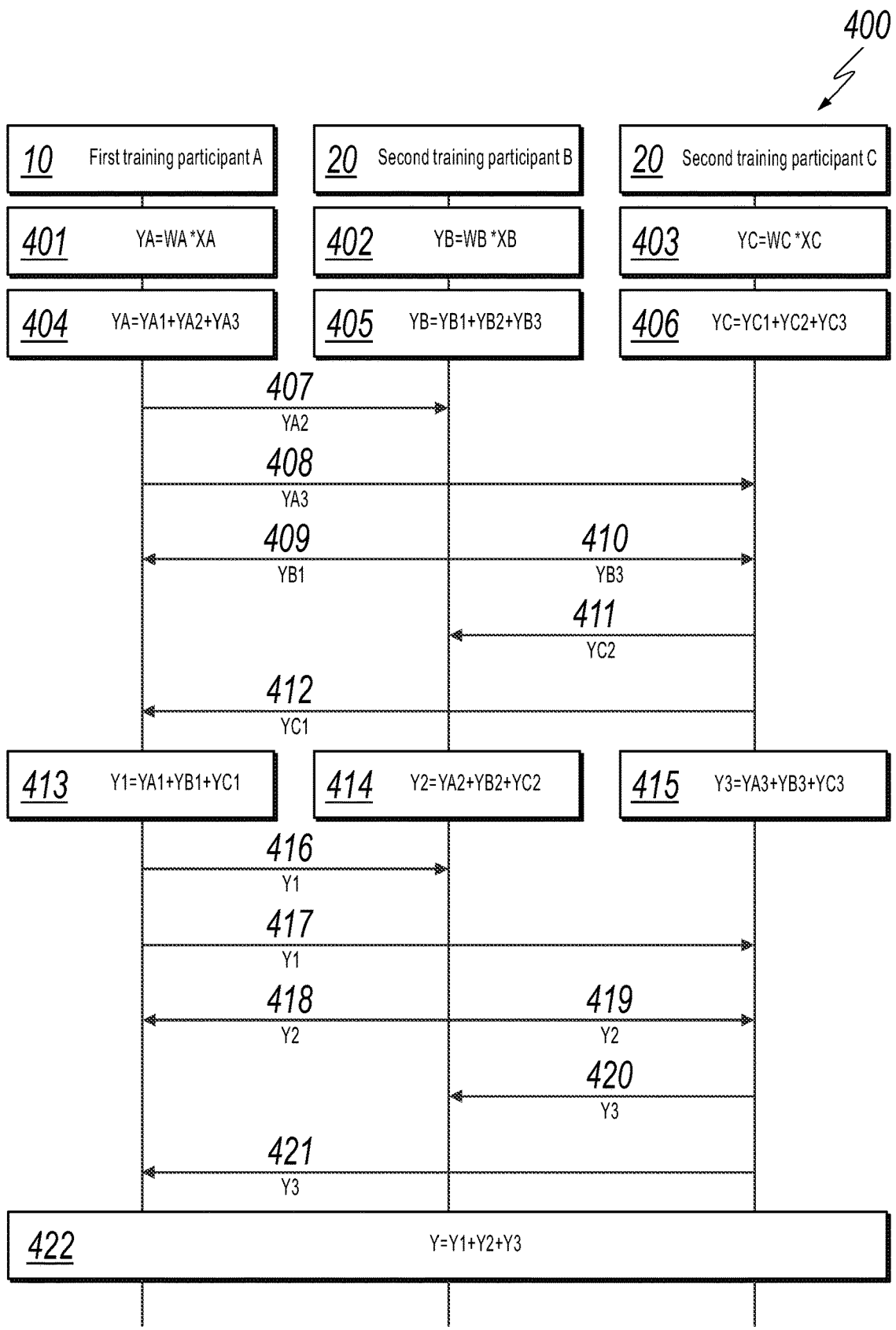
FIG. 4 shows a flowchart of an example of a secret sharing matrix addition process in FIG. 3.

FIG. 4 shows a flowchart of an example of a secret sharing matrix addition process in FIG. 3. In FIG. 4, one first training participant Alice and two second training participants Bob and Charlie are used as an example for description.

As shown in FIG. 4, first, at block 401, at first training participant Alice, a product of current sub-model $W_A$ owned by Alice and corresponding feature sample subset $X_A$ is calculated, so as to obtain prediction value vector $Y_A = W_A * X_A$ of first training participant Alice.

At block 402, at second training participant Bob, a product of current sub-model $W_B$ owned by Bob and corresponding feature sample subset $X_B$ is calculated to obtain prediction value vector $Y_B = W_B * X_B$ of second training participant Bob.

At block 403, at second training participant Charlie, a product of current sub-model $W_C$ owned by Charlie and corresponding feature sample subset $X_C$ is calculated to obtain prediction value vector $Y_C = W_C * X_C$ of second training participant Charlie.

Then, at block 404, at first training participant Alice, the calculated prediction value vector $Y_A$ is decomposed into three prediction value sub-vectors $Y_{A1}$, $Y_{A2}$, and $Y_{A3}$, where $Y_A = Y_{A1} + Y_{A2} + Y_{A3}$. At block 405, at second training participant Bob, the calculated prediction value vector $Y_B$ is decomposed into three prediction value sub-vectors $Y_{B1}$, $T_{B2}$, and $Y_{B3}$, where $Y_B = Y_{B1} + Y_{B2} + Y_{B3}$. At block 406, at second training participant Charlie, the calculated prediction value vector $Y_C$ is decomposed into three prediction value sub-vectors $Y_{C1}$, $Y_{C2}$, and $Y_{C3}$, where $Y_C = Y_{C1} + Y_{C2} + Y_{C3}$. It should be noted here that, because three training participants are shown in FIG. 4, a quantity of prediction value submatrices obtained after decomposition processing is also 3. When the quantity of participants participating in model training changes, the quantity of obtained prediction value submatrices also correspondingly changes. In the present disclosure, the quantity of prediction value submatrices is equal to the quantity of training participants. In addition, the previous vector decomposition process can be any decomposition. For example, two sub-vectors can be randomly generated, and then a third sub-vector is obtained.

Then, at block 407, Alice sends the obtained prediction value sub-vector $Y_{A2}$ to second training participant Bob, and at block 408, Alice sends the obtained prediction value sub-vector $Y_{A3}$ to second training participant Charlie. At block 409, Bob sends the obtained prediction value sub-vector $Y_{B1}$ to first training participant Alice, and at block 410, Bob sends the obtained prediction value sub-vector $Y_{B3}$ to second training participant Charlie. At block 411, Charlie sends the obtained prediction value sub-vector $Y_{C2}$ to second training participant Bob, and at block 412, Charlie sends the obtained prediction value sub-vector $Y_{C1}$ to first training participant Alice.

Then, at block 413, at first training participant Alice, the obtained prediction value sub-vectors of all training participants are summed to obtain prediction value sub-vector sum value $Y_1 = Y_{A1} + Y_{B1} + Y_{C1}$ at first training participant Alice. At block 414, at second training participant Bob, the obtained prediction value sub-vectors of all training participants are summed to obtain prediction value sub-vector sum value $Y_2 = Y_{A2} + Y_{B2} + Y_{C2}$ at second training participant Bob. At block 415, at second training participant Charlie, the obtained prediction value sub-vectors of all training participants are summed to obtain prediction value sub-vector sum value $Y_3 = Y_{A3} + Y_{B3} + Y_{C3}$ at second training participant Charlie.

Then, at block 416 and block 417, Alice separately sends the obtained prediction value sub-vector sum value $Y_1$ to second training participants Bob and Charlie, and at block 418 and block 419, Bob separately sends the obtained prediction value sub-vector sum value $Y_2$ to first training participant Alice and second training participant Charlie. At block 420 and block 421, Charlie separately sends the obtained prediction value sub-vector sum value $Y_3$ to second training participant Bob and first training participant Alice.

Then, at block 422, at each training participant, the obtained prediction value sub-vector sum values of all training participants are summed to obtain the current predichon value of the linear/logistic regression model for the feature sample set $Y = Y_1 + Y_2 + Y_3$.

In addition, it is worthwhile to note that FIG. 3 and FIG. 4 show model training solutions of one first training participant and two second training participants. In another example of the present disclosure, one first training participant and more than two second training participants can also be included.

By using the linear/logistic regression model training methods disclosed in FIG. 3 and FIG. 4, model parameters of the linear/logistic regression model can be obtained through training without leaking secret data of the plurality of training participants, and a workload of model training is only in a linear relationship with a quantity of feature samples used for training, rather than an exponential relationship, so model training efficiency can be improved while ensuring respective data security of the plurality of training participants.

Figure 5:
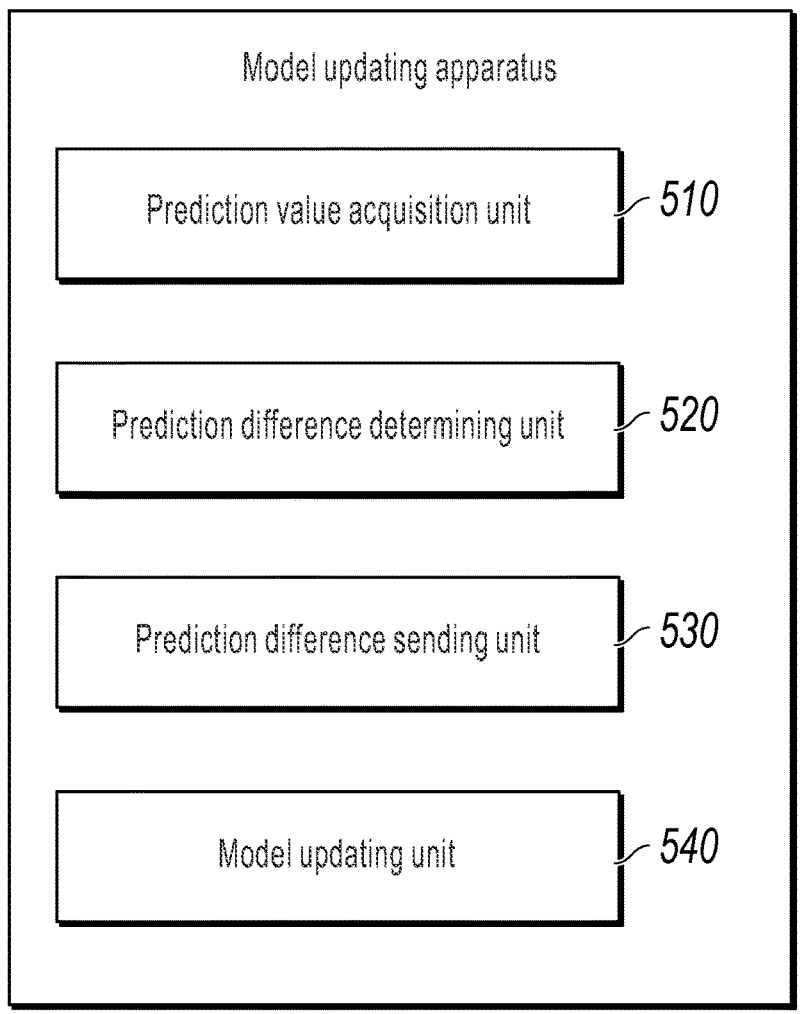
FIG. 5 shows a block diagram of an apparatus for collaboratively training a linear/logistic regression model by a plurality of training participants according to one or more embodiments of the present disclosure.

FIG. 5 shows a schematic diagram of an apparatus 500 for collaboratively training a linear/logistic regression model by a plurality of training participants (hereinafter referred to as a model training apparatus) according to one or more embodiments of the present disclosure. As shown in FIG. 5, the model training apparatus 500 includes a prediction value acquisition unit 510, a prediction difference determining unit 520, a prediction difference sending unit 530, and a model updating unit 540.

During model training, the prediction value acquisition unit 510, the prediction difference determining unit 520, the prediction difference sending unit 530, and the model updating unit 540 are configured to perform an operation cyclically until a predetermined condition is satisfied. The predetermined condition can include: reaching a predetermined quantity of iterations; or a determined prediction difference is within a predetermined range.

Specifically, in each iterative process, the prediction value acquisition unit 510 is configured to use secret sharing matrix addition based on a current sub-model of each training participant and a corresponding feature sample subset to obtain a current prediction value of the linear/logistic regression model for a feature sample set (a feature sample set used for training), where the feature sample subset is obtained by performing vertical segmentation on the feature sample set. For an operation of the prediction value acquisition unit 510, refer to the operation at block 320 described above with reference to FIG. 3 and the operation performed by the first training participant side shown in FIG. 4.

The prediction difference determining unit 520 is configured to determine a prediction difference between the current prediction value of the feature sample set and a corresponding label. For an operation of the prediction difference determining unit 520, refer to the operation at block 330 described above with reference to FIG. 3.

The prediction difference sending unit 530 is configured to send the determined prediction difference to each second training participant, so at each second training participant, a current sub-model of the second training participant is updated based on the current sub-model of the second training participant and a product of a feature sample subset of the second training participant and the determined prediction difference. For an operation of the prediction difference sending unit 530, refer to the operation at block 340 described above with reference to FIG. 3.

The model updating unit 540 is configured to update a current sub-model of the first training participant based on the current sub-model of the first training participant and a product of a feature sample subset of the first training participant and the determined prediction difference, where when an iterative process does not end, the updated current sub-models of the first training participant and each second training participant are used as current sub-models of a next iterative process. For an operation of the model updating unit 540, refer to the operation at block 350 described above with reference to FIG. 3.

Figure 6:
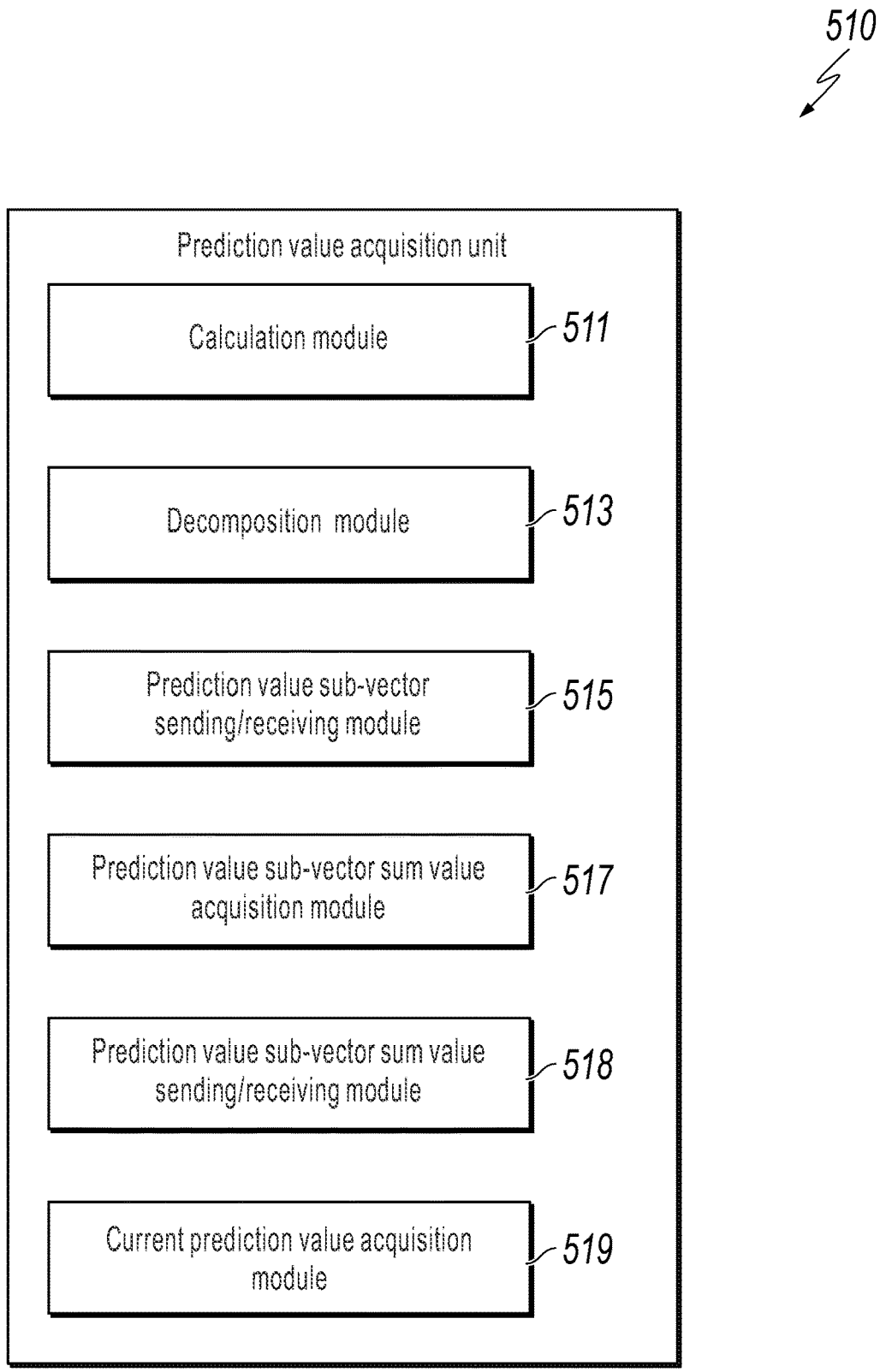
FIG. 6 shows a block diagram of an implementation example of a prediction value acquisition unit in FIG. 5.

FIG. 6 shows a block diagram of an implementation example of the prediction value acquisition unit 510 in FIG. 5. As shown in FIG. 6, the prediction value acquisition unit 510 includes a calculation module 511, a decomposition module 513, a prediction value sub-vector sending/receiving module 515, a prediction value sub-vector sum value acquisition module 517, a prediction value sub-vector sum value sending/receiving module 518, and a current prediction value acquisition module 519. In the example shown in FIG. 6, a sub-model of each training participant is represented by using a weight sub-vector, and a feature sample set and a prediction value are represented by using a feature matrix and a prediction value vector, respectively.

The calculation module 511 is configured to calculate a product of a weight sub-vector of the first training participant and a corresponding feature matrix, to obtain a prediction value vector of the first training participant. For an operation of the calculation module 511, refer to the operation at block 401 described above with reference to FIG. 4.

The decomposition module 513 is configured to decompose the calculated prediction value vector of the first training participant into a first quantity of prediction value sub-vectors, where the first quantity is equal to a quantity of the training participants. For an operation of the decomposition module 513, refer to the operation at block 404 described above with reference to FIG. 4.

The prediction value sub-vector sending/receiving module 515 is configured to separately send a second quantity of prediction value sub-vectors to each second training participant, and receive a corresponding prediction value sub-vector from each second training participant, where the second quantity is equal to the first quantity minus one, a prediction value sub-vector of each second training participant is obtained by decomposing a prediction value vector of the second training participant into the first quantity of prediction value sub-vectors, and the prediction value vector of the second training participant is obtained by calculating a product of a weight sub-vector of the second training participant and a corresponding feature matrix; For operations of the prediction value sub-vector sending/receiving module 515, refer to the operations at blocks 407, 409, and 412 described above with reference to FIG. 4.

The prediction value sub-vector sum value acquisition module 517 is configured to sum the obtained prediction value sub-vectors of all training participants to obtain a prediction value sub-vector sum value of the first training participant. For an operation of the prediction value sub-vector sum value acquisition module 517, refer to the operation at block 413 described above with reference to FIG. 4.

The prediction value sub-vector sum value sending/receiving module 518 is configured to: separately send the prediction value sub-vector sum value of the first training participant to each second training participant, and receiving a corresponding prediction value sub-vector sum value from each second training participant, where the prediction value sub-vector sum value of the second training participant is obtained by summing prediction value sub-vectors obtained by the second training participant. For operations of the prediction value sub-vector sum value sending/receiving module 518, refer to the operations at blocks 416, 417, 418, and 421 described above with reference to FIG. 4.

The current prediction value acquisition module 519 is configured to sum all prediction value sub-vector sum values obtained to obtain the current prediction value of the linear/logistic regression model for the feature sample set. For an operation of the current prediction value acquisition module 519, refer to the operation at block 422 described above with reference to FIG. 4.

Figure 7:
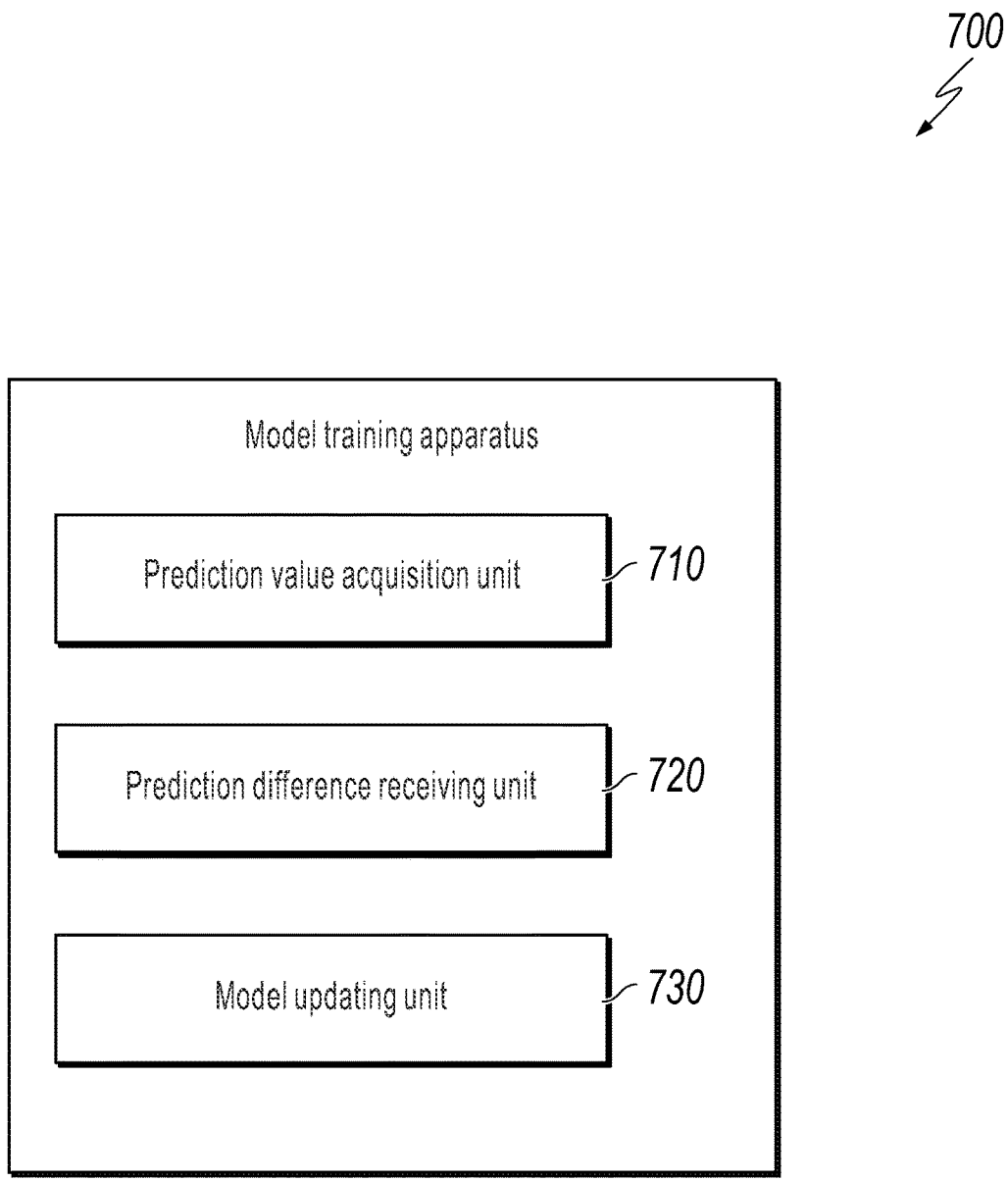
FIG. 7 shows a block diagram of an apparatus for collaboratively training a linear/logistic regression model by a plurality of training participants according to one or more embodiments of the present disclosure.

FIG. 7 shows a block diagram of an apparatus for collaboratively training a linear/logistic regression model by a plurality of training participants (hereinafter referred to as a model training apparatus 700) according to one or more embodiments of the present disclosure. As shown in FIG. 7, the model training apparatus 700 includes a prediction value acquisition unit 710, a prediction difference receiving unit 720, and a model updating unit 730.

During model training, the prediction value acquisition unit 710, the prediction difference receiving unit 720, and the model updating unit 730 are configured to perform an operation cyclically until a predetermined condition is satisfied. The predetermined condition can include: reaching a predetermined quantity of iterations; or a determined prediction difference is within a predetermined range.

Specifically, in each iterative process, the prediction value acquisition unit 710 is configured to use secret sharing matrix addition based on a current sub-model of each training participant and a corresponding feature sample subset to obtain a current prediction value of the linear/logistic regression model for a feature sample set used for training, where the feature sample subset is obtained by performing vertical segmentation on the feature sample set. For an operation of the prediction value acquisition unit 710, refer to the operation at block 320 described above with reference to FIG. 3 and the operation performed by any second training participant side shown in FIG. 4.

The prediction difference receiving unit 720 is configured to receive a prediction difference from the first training participant, where the prediction difference is determined at the first training participant based on the current prediction value of the feature sample set and a corresponding label. For an operation of the prediction difference receiving unit 720, refer to the operation at block 340 described above with reference to FIG. 3.

The model updating unit 730 is configured to update a current sub-model of the second training participant based on the current sub-model of the second training participant and a product of the received prediction difference and a feature sample subset of the second training participant, where when an iterative process does not end, the updated current sub-model of the second training participant is used as a current sub-model of a next training iterative process. For an operation of the model updating unit 730, refer to the operation at block 350 described above with reference to FIG. 3.

Figure 8:
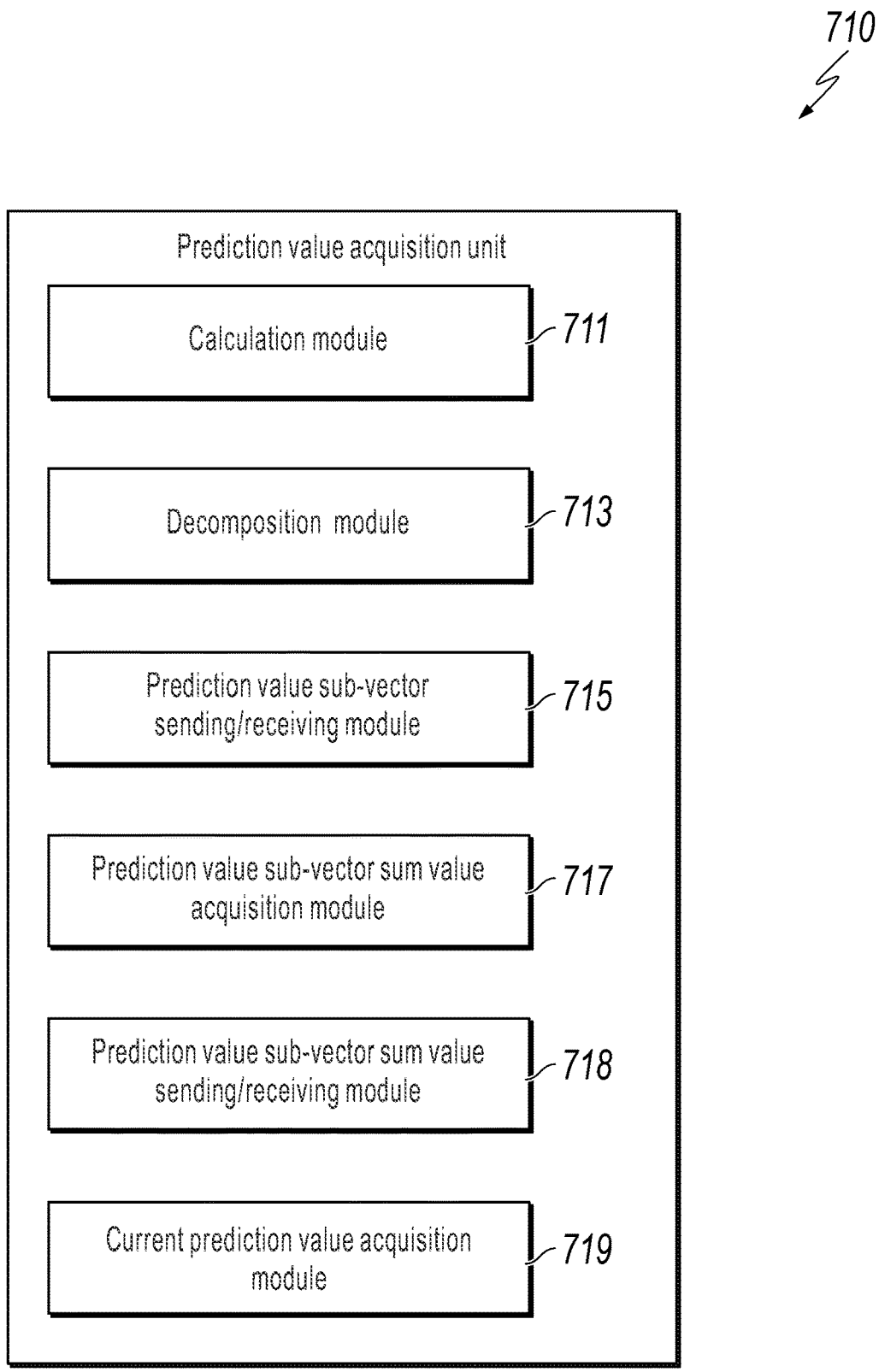
FIG. 8 shows a block diagram of an implementation example of a prediction value acquisition unit in FIG. 7.

FIG. 8 shows a block diagram of an implementation example of the prediction value acquisition unit 710 in FIG. 7. As shown in FIG. 8, the prediction value acquisition unit 710 includes a calculation module 711, a decomposition module 713, a prediction value sub-vector sending/receiving module 715, a prediction value sub-vector sum value acquisition module 717, a prediction value sub-vector sum value sending/receiving module 718, and a current prediction value acquisition module 719. In the example shown in FIG. 8, a sub-model of each training participant is represented by using a weight sub-vector, and a feature sample set and a prediction value are represented by using a feature matrix and a prediction value vector, respectively.

The calculation module 711 is configured to calculate a product of a weight sub-vector of the second training participant and a corresponding feature matrix, to obtain a prediction value vector of the second training participant. For an operation of the calculation module 711, refer to the operation at block 402 or 403 described above with reference to FIG. 4.

The decomposition module 713 is configured to decompose the calculated prediction value vector of the second training participant into a first quantity of prediction value sub-vectors, where the first quantity is equal to a quantity of the training participants. For an operation of the decomposition module 713, refer to the operation at block 405 or 406 described above with reference to FIG. 4.

The prediction value sub-vector sending/receiving module 715 is configured to separately send a second quantity of prediction value sub-vectors to the first training participant and each remaining second training participant, and receive corresponding prediction value sub-vectors from the first training participant and each remaining second training participant, where the second quantity is equal to the first quantity minus one, a prediction value sub-vector of each second training participant is obtained by decomposing a prediction value vector of the second training participant into the first quantity of prediction value sub-vectors, and the prediction value vector of the second training participant is obtained by calculating a product of a weight sub-vector of the second training participant and a corresponding feature matrix. For operations of the prediction value sub-vector sending/receiving module 715, refer to the operations at blocks 407 to 412 described above with reference to FIG. 4.

The prediction value sub-vector sum value acquisition module 717 is configured to sum the obtained prediction value sub-vectors of all training participants to obtain a prediction value sub-vector sum value of the second training participant. For an operation of the prediction value sub-vector sum value acquisition module 717, refer to the operation at block 414 or 415 described above with reference to FIG. 4.

The prediction value sub-vector sum value sending/receiving module 718 is configured to separately send the prediction value sub-vector sum value of the second training participant to the first training participant and each remaining second training participant, and receive corresponding prediction value sub-vector sum values from the first training participant and each remaining second training participant, where the prediction value sub-vector sum value of the second training participant is obtained by summing prediction value sub-vectors obtained by the second training participant. For operations of the prediction value sub-vector sum value sending/receiving module 718, refer to the operations at blocks 416 to 421 described above with reference to FIG. 4.

The current prediction value acquisition module 719 is configured to sum all prediction value sub-vector sum values obtained to obtain the current prediction value of the linear/logistic regression model for the feature sample set. For an operation of the current prediction value acquisition module 719, refer to the operation at block 422 described above with reference to FIG. 4.

Referring to FIG. 1 to FIG. 8, the previous describes embodiments of a model training method, apparatus, and system according to the present disclosure. The previous model training apparatus can be implemented by using hardware, or can be implemented by using software or a combination of hardware and software.

Figure 9:
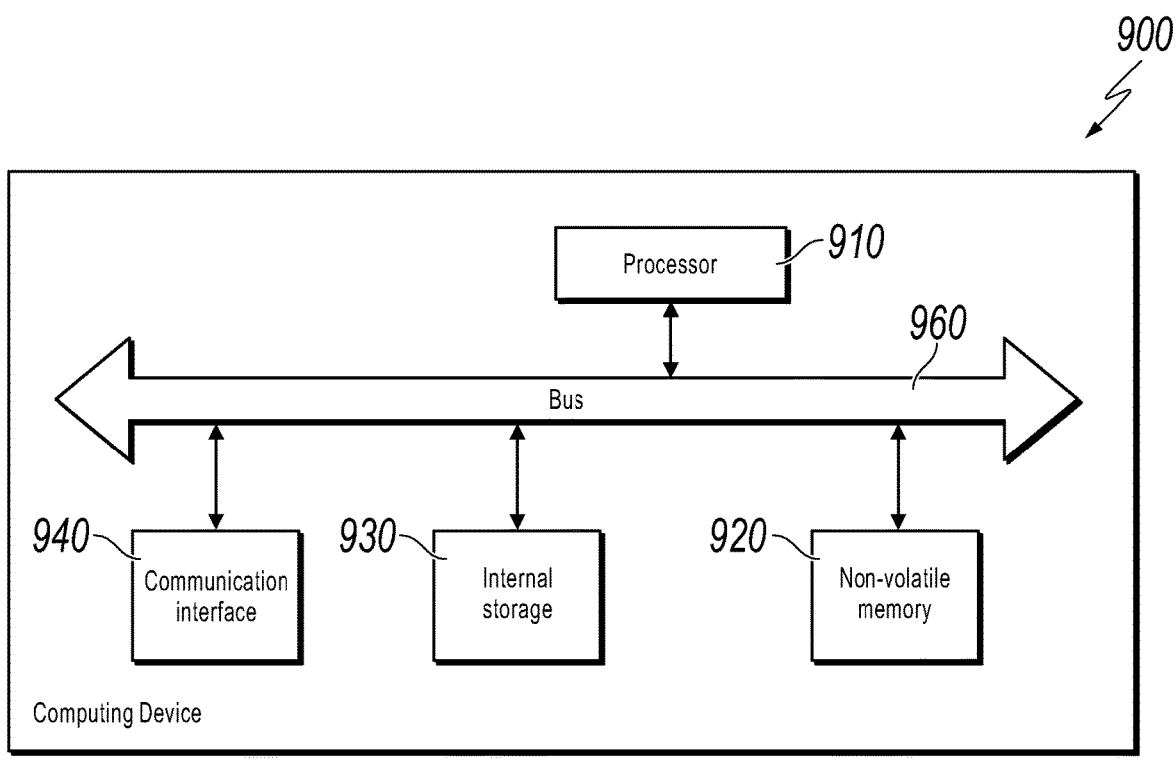
FIG. 9 shows a schematic diagram of a computing device for collaboratively training a linear/logistic regression model by a plurality of training participants according to one or more embodiments of the present disclosure.

FIG. 9 shows a hardware structure diagram of a computing device 900 for implementing collaborative training of a linear/logistic regression model by a plurality of training participants according to one or more embodiments of the present disclosure. As shown in FIG. 9, the computing device 900 can include at least one processor 910, a memory 920, an internal storage 930, and a communications interface 940, and the at least one processor 910, the memory 920, the internal storage 930, and the communications interface 940 are connected together by using a bus 960. The at least one processor 910 executes at least one computer readable instruction (that is, the previous element implemented in the form of software) stored or encoded in the memory 920.

In one or more embodiments, computer executable instructions are stored in the memory 920, and when being executed, the computer executable instructions cause the at least one processor 910 to perform the following iterative process until a predetermined condition is satisfied: using secret sharing matrix addition based on a current sub-model of each training participant and a feature sample subset of each training participant to obtain a current prediction value of the linear/logistic regression model for a feature sample set, where the feature sample subset is obtained by performing vertical segmentation on the feature sample set; determining a prediction difference between the current prediction value of the feature sample set and a corresponding label; sending the determined prediction difference to each second training participant, so at each second training participant, a current sub-model of the second training participant is updated based on the current sub-model of the second training participant and a product of a corresponding feature sample subset and the prediction difference; and updating a current sub-model of the first training participant based on the current sub-model of the first training participant and a product of a feature sample subset of the first training participant and the prediction difference; where when the iterative process does not end, the updated current sub-models of the first training participant and each second training participant are used as current sub-models of a next iterative process.

It should be understood that, when the computer executable instructions stored in the memory 920 are executed, the at least one processor 910 performs the previous operations and functions described with reference to FIG. 1 to FIG. 8 in the embodiments of the present disclosure.

Figure 10:
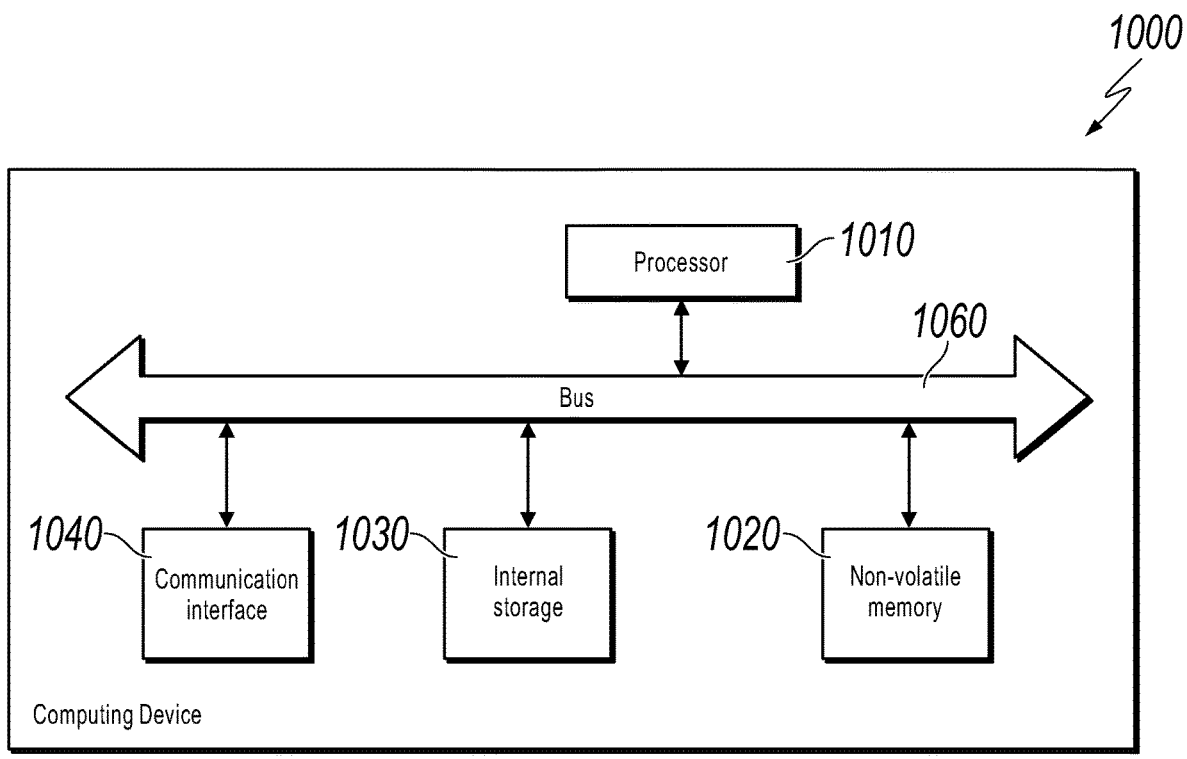
FIG. 10 shows a schematic diagram of a computing device for collaboratively training a linear/logistic regression model by a plurality of training participants according to one or more embodiments of the present disclosure.

FIG. 10 shows a hardware structure diagram of a computing device 1000 for implementing collaborative training of a linear/logistic regression model by a plurality of training participants according to one or more embodiments of the present disclosure. As shown in FIG. 10, the computing device 1000 can include at least one processor 1010, a memory 1020, an internal storage 1030, and a communications interface 1040, and the at least one processor 1010, the memory 1020, the internal storage 1030, and the communications interface 1040 are connected together by using a bus 1060. The at least one processor 1010 executes at least one computer readable instruction (that is, the previous element implemented in the form of software) stored or encoded in the memory 1020.

In one or more embodiments, computer executable instructions are stored in the memory 1020, and when being executed, the computer executable instructions cause the at least one processor 1010 to perform the following iterative process until a predetermined condition is satisfied: using secret sharing matrix addition based on a current sub-model of each training participant and a corresponding feature sample subset to obtain a current prediction value of the linear/logistic regression model for a feature sample set, where the feature sample subset is obtained by performing vertical segmentation on the feature sample set; receiving a prediction difference from the first training participant, where the prediction difference is determined at the first training participant based on the current prediction value of the feature sample set and a corresponding label; and updating a current sub-model of the second training participant based on the current sub-model of the second training participant and a product of the prediction difference and a feature sample subset of the second training participant, where when the iterative process does not end, the updated current sub-model of the second training participant is used as a current sub-model of a next training iterative process.

It should be understood that, when the computer executable instructions stored in the memory 1020 are executed, the at least one processor 1010 performs the previous operations and functions described with reference to FIG. 1 to FIG. 8 in the embodiments of the present disclosure.

According to one or more embodiments, a program product such as a non-transitory machine readable medium is provided. The non-transitory machine readable medium can have instructions (that is, the previous elements implemented in software form). When the instructions are executed by a machine, the machine performs the previous operations and functions described with reference to FIG. 1 to FIG. 8 in the embodiments of the present disclosure. Specifically, a system or device equipped with a readable storage medium can be provided, and software program code for implementing a function of any one of the previous embodiments is stored in the readable storage medium, so a computer or a processor of the system or device reads and executes instructions stored in the readable storage medium.

According to one or more embodiments, a program product such as a non-transitory machine readable medium is provided. The non-transitory machine readable medium can have instructions (that is, the previous elements implemented in software form). When the instructions are executed by a machine, the machine performs the previous operations and functions described with reference to FIG. 1 to FIG. 8 in the embodiments of the present disclosure. Specifically, a system or device equipped with a readable storage medium can be provided, and software program code for implementing a function of any one of the previous embodiments is stored in the readable storage medium, so a computer or a processor of the system or device reads and executes instructions stored in the readable storage medium.

In this case, the program code read from the readable medium can implement a function of any one of the previous embodiments. Therefore, the machine readable code and the readable storage medium that stores the machine readable code constitute a part of the present disclosure.

Embodiments of the readable storage medium include a floppy disk, a hard disk, a magneto-optical disk, an optical disc (such as a CD-ROM, a CD-R, a CD-RW, a DVD-ROM, a DVD-RAM, a DVD-RW, a DVD-RW), a magnetic tape, a non-volatile memory card, and a ROM. Optionally, program code can be downloaded from a server computer or cloud by a communications network.

A person skilled in the art should understand that various variations and modifications can be made to the embodiments disclosed above without departing from the essence of the present disclosure. Therefore, the protection scope of the present disclosure shall be limited by the appended claims.

It is worthwhile to note that not all steps and units in the previous processes and system structure diagrams are required. Some steps or units can be ignored based on actual needs. An execution sequence of each step is not fixed, and can be determined based on needs. The device structure described in the previous embodiments can be a physical structure, or can be a logical structure, that is, some units may be implemented by a same physical entity, or some units may be implemented by a plurality of physical entities, or can be implemented jointly by some components in a plurality of independent devices.

In the previous embodiments, the hardware unit or module can be implemented in a mechanical method or an electrical method. For example, a hardware unit, module, or processor can include permanent dedicated circuits or logic (e.g., dedicated processors, FPGAs or ASICs) to complete corresponding operations. The hardware unit or the processor can further include a programmable logic or circuit (such as a general purpose processor or another programmable processor), and can be temporarily set by the software to complete a corresponding operation. A specific embodiment (a mechanical method, a dedicated permanent circuit, or a temporarily set circuit) can be determined based on cost and time considerations.

The previous describes example embodiments with reference to the accompanying drawings, but does not represent all embodiments that can be implemented or fall within the protection scope of the claims. The term "example" used throughout the present specification means "used as an example, an instance, or an illustration" and does not mean "preferred" or "advantageous" over other embodiments. For the purpose of providing an understanding of the described technology, a specific implementation includes specific details. However, these techniques can be implemented without these specific details. In some examples, well-known structures and devices are shown in block diagrams in order to avoid making it difficult to understand the concepts of the described embodiments.

The previous descriptions of the present disclosure are provided to enable any person of ordinary skill in the art to implement or use the present disclosure. It is obvious to a person of ordinary skill in the art that various modifications can be made to the present disclosure. In addition, the general principle defined in the present specification can be applied to another variant without departing from the protection scope of the present disclosure. Therefore, the present disclosure is not limited to the examples and designs described here, but is consistent with the widest range of principles and novelty features that conform to the disclosure.

What is claimed is:

1. A computer-implemented method for training a regression model, comprising:
    performing, by a first training participant, an iterative process until a predetermined condition is satisfied, wherein the regression model is trained in the iterative process by a plurality of training participants, wherein the regression model comprises a plurality of sub-models, wherein each training participant has a sub-model, wherein the plurality of training participants comprise the first training participant having a set of labels and at least two second training participants not having the set of labels, wherein the sub-model of each training participant is used as a current sub-model of each training participant in a first iteration of the iterative process, wherein the iterative process comprises:
    obtaining, using secret sharing matrix addition and based on the current sub-model of each training participant and a corresponding feature sample subset of each training participant, a current prediction value of the regression model for a feature sample set, wherein the corresponding feature sample subset of each training participant is obtained by performing vertical segmentation on the feature sample set;
    determining a prediction difference between the current prediction value and a label corresponding to the current prediction value;
    sending the prediction difference to each second training participant, wherein at each second training participant, a current sub-model of the second training participant is updated based on the current sub-model of the second training participant and a product of a corresponding feature sample subset of the second training participant and the prediction difference; and
    updating a current sub-model of the first training participant based on the current sub-model of the first training participant and a product of a corresponding feature sample subset of the first training participant and the prediction difference, wherein when the iterative process does not end, an updated current sub-model of each training participant is used as the current sub-model of each training participant in a next iterative process.

2. The computer-implemented method of claim 1, wherein the sub-model of each training participant comprises a weight sub-vector, wherein the corresponding feature sample subset of each training participant comprises a feature matrix, and wherein the current prediction value comprises a prediction value vector.

3. The computer-implemented method of claim 2, wherein obtaining the current prediction value of the regression model for the feature sample set comprises:
    obtaining, by calculating a product of a first weight sub-vector of the first training participant and a first feature matrix of the first training participant, a first prediction value vector of the first training participant; and
    decomposing the first prediction value vector into a first quantity of first prediction value sub-vectors, wherein the first quantity is equal to a quantity of the training participants.

4. The computer-implemented method of claim 3, comprising:
- sending a second quantity of first prediction value sub-vectors to the at least two second training participants, wherein the second quantity is equal to the first quantity minus one, wherein each first prediction value sub-vector of the second quantity of first prediction value sub-vectors is sent to a corresponding second training participant, and wherein the second quantity of first prediction value sub-vectors are comprised in the first quantity of first prediction value sub-vectors; and
- receiving a corresponding second prediction value sub-vector from each second training participant, wherein the corresponding second prediction value sub-vector is obtained by decomposing a second prediction value vector of the second training participant into the first quantity of second prediction value sub-vectors, and wherein the second prediction value vector is obtained by calculating a product of a second weight sub-vector of the second training participant and a second feature matrix of the second training participant.

5. The computer-implemented method of claim 4, comprising:
- summing a first prediction value sub-vector and the corresponding second prediction value sub-vector from each second training participant to obtain a first prediction value sub-vector sum value of the first training participant;
- separately sending the first prediction value sub-vector sum value to each second training participant;
- receiving a corresponding second prediction value sub-vector sum value from each second training participant, wherein the corresponding second prediction value sub-vector sum value is obtained by summing prediction value sub-vectors obtained by a corresponding second training participant; and
- summing the first prediction value sub-vector sum value and the corresponding second prediction value sub-vector sum value from each second training participant to obtain the current prediction value of the regression model for the feature sample set.

6. The computer-implemented method of claim 1, wherein updating the current sub-model of the first training participant comprises:
- updating the current sub-model of the first training participant based on a following equation:

$$W_{n+1} = W_B - \alpha \cdot X_j \cdot e,$$

wherein $W_{n+1}$ represents the updated current sub-model of the first training participant, $W_n$ represents the current sub-model of the first training participant, $\alpha$ represents a learning rate, $X_j$ represents the corresponding feature sample subset of the first training participant, and e represents the prediction difference.

7. The computer-implemented method of claim 1, wherein the predetermined condition comprises:
- a predetermined quantity of iterations is reached; or
- the prediction difference is within a predetermined range.

8. A non-transitory, computer-readable medium storing one or more instructions executable by a computer system to perform operations comprising:
- performing, by a first training participant, an iterative process until a predetermined condition is satisfied, wherein a regression model is trained in the iterative process by a plurality of training participants, wherein the regression model comprises a plurality of sub-models, wherein each training participant has a sub-model, wherein the plurality of training participants comprise the first training participant having a set of labels and at least two second training participants not having the set of labels, wherein the sub-model of each training participant is used as a current sub-model of each training participant in a first iteration of the iterative process, wherein the iterative process comprises:
  - obtaining, using secret sharing matrix addition and based on the current sub-model of each training participant and a corresponding feature sample subset of each training participant, a current prediction value of the regression model for a feature sample set, wherein the corresponding feature sample subset of each training participant is obtained by performing vertical segmentation on the feature sample set;
  - determining a prediction difference between the current prediction value and a label corresponding to the current prediction value;
  - sending the prediction difference to each second training participant, wherein at each second training participant, a current sub-model of the second training participant is updated based on the current sub-model of the second training participant and a product of a corresponding feature sample subset of the second training participant and the prediction difference; and
  - updating a current sub-model of the first training participant based on the current sub-model of the first training participant and a product of a corresponding feature sample subset of the first training participant and the prediction difference, wherein when the iterative process does not end, an updated current sub-model of each training participant is used as the current sub-model of each training participant in a next iterative process.

9. The non-transitory, computer-readable medium of claim 8, wherein the sub-model of each training participant comprises a weight sub-vector, wherein the corresponding feature sample subset of each training participant comprises a feature matrix, and wherein the current prediction value comprises a prediction value vector.

10. The non-transitory, computer-readable medium of claim 9, wherein obtaining the current prediction value of the regression model for the feature sample set comprises:
- obtaining, by calculating a product of a first weight sub-vector of the first training participant and a first feature matrix of the first training participant, a first prediction value vector of the first training participant; and
- decomposing the first prediction value vector into a first quantity of first prediction value sub-vectors, wherein the first quantity is equal to a quantity of the training participants.

11. The non-transitory, computer-readable medium of claim 10, the operations comprising:
- sending a second quantity of first prediction value sub-vectors to the at least two second training participants, wherein the second quantity is equal to the first quantity minus one, wherein each first prediction value sub-vector of the second quantity of first prediction value sub-vectors is sent to a corresponding second training participant, and wherein the second quantity of first prediction value sub-vectors are comprised in the first quantity of first prediction value sub-vectors; and
- receiving a corresponding second prediction value sub-vector from each second training participant, wherein the corresponding second prediction value sub-vector is obtained by decomposing a second prediction value vector of the second training participant into the first quantity of second prediction value sub-vectors, and wherein the second prediction value vector is obtained by calculating a product of a second weight sub-vector of the second training participant and a second feature matrix of the second training participant.

12. The non-transitory, computer-readable medium of claim 11, the operations comprising:
summing a first prediction value sub-vector and the corresponding second prediction value sub-vector from each second training participant to obtain a first prediction value sub-vector sum value of the first training participant;
separately sending the first prediction value sub-vector sum value to each second training participant;
receiving a corresponding second prediction value sub-vector sum value from each second training participant, wherein the corresponding second prediction value sub-vector sum value is obtained by summing prediction value sub-vectors obtained by a corresponding second training participant; and
summing the first prediction value sub-vector sum value and the corresponding second prediction value sub-vector sum value from each second training participant to obtain the current prediction value of the regression model for the feature sample set.

13. The non-transitory, computer-readable medium of claim 8, wherein updating the current sub-model of the first training participant comprises:
updating the current sub-model of the first training participant based on a following equation:

$$W_{n+1} = W_B - \alpha \cdot X_j \cdot e,$$

wherein $W_{n+1}$ represents the updated current sub-model of the first training participant, $W_n$ represents the current sub-model of the first training participant, $\alpha$ represents a learning rate, $X_j$ represents the corresponding feature sample subset of the first training participant, and e represents the prediction difference.

14. The non-transitory, computer-readable medium of claim 8, wherein the predetermined condition comprises:
a predetermined quantity of iterations is reached; or
the prediction difference is within a predetermined range.

15. A computer-implemented system, comprising:
one or more computers; and
one or more computer memory devices interoperably coupled with the one or more computers and having tangible, non-transitory, machine-readable media storing one or more instructions that, when executed by the one or more computers, cause the one or more computers to perform operations comprising:
performing, by a first training participant, an iterative process until a predetermined condition is satisfied, wherein a regression model is trained in the iterative process by a plurality of training participants, wherein the regression model comprises a plurality of sub-models, wherein each training participant has a sub-model, wherein the plurality of training participants comprise the first training participant having a set of labels and at least two second training participants not having the set of labels, wherein the sub-model of each training participant is used as a current sub-model of each training participant in a first iteration of the iterative process, wherein the iterative process comprises:

obtaining, using secret sharing matrix addition and based on the current sub-model of each training participant and a corresponding feature sample subset of each training participant, a current prediction value of the regression model for a feature sample set, wherein the corresponding feature sample subset of each training participant is obtained by performing vertical segmentation on the feature sample set;
determining a prediction difference between the current prediction value and a label corresponding to the current prediction value;
sending the prediction difference to each second training participant, wherein at each second training participant, a current sub-model of the second training participant is updated based on the current sub-model of the second training participant and a product of a corresponding feature sample subset of the second training participant and the prediction difference; and
updating a current sub-model of the first training participant based on the current sub-model of the first training participant and a product of a corresponding feature sample subset of the first training participant and the prediction difference, wherein when the iterative process does not end, an updated current sub-model of each training participant is used as the current sub-model of each training participant in a next iterative process.

16. The computer-implemented system of claim 15, wherein the sub-model of each training participant comprises a weight sub-vector, wherein the corresponding feature sample subset of each training participant comprises a feature matrix, and wherein the current prediction value comprises a prediction value vector.

17. The computer-implemented system of claim 16, wherein obtaining the current prediction value of the regression model for the feature sample set comprises:
obtaining, by calculating a product of a first weight sub-vector of the first training participant and a first feature matrix of the first training participant, a first prediction value vector of the first training participant; and
decomposing the first prediction value vector into a first quantity of first prediction value sub-vectors, wherein the first quantity is equal to a quantity of the training participants.

18. The computer-implemented system of claim 17, the operations comprising:
sending a second quantity of first prediction value sub-vectors to the at least two second training participants, wherein the second quantity is equal to the first quantity minus one, wherein each first prediction value sub-vector of the second quantity of first prediction value sub-vectors is sent to a corresponding second training participant, and wherein the second quantity of first prediction value sub-vectors are comprised in the first quantity of first prediction value sub-vectors; and
receiving a corresponding second prediction value sub-vector from each second training participant, wherein the corresponding second prediction value sub-vector is obtained by decomposing a second prediction value vector of the second training participant into the first quantity of second prediction value sub-vectors, and wherein the second prediction value vector is obtained by calculating a product of a second weight sub-vector of the second training participant and a second feature matrix of the second training participant.

19. The computer-implemented system of claim 18, the operations comprising:
- summing a first prediction value sub-vector and the corresponding second prediction value sub-vector from each second training participant to obtain a first prediction value sub-vector sum value of the first training participant;
- separately sending the first prediction value sub-vector sum value to each second training participant;
- receiving a corresponding second prediction value sub-vector sum value from each second training participant, wherein the corresponding second prediction value sub-vector sum value is obtained by summing prediction value sub-vectors obtained by a corresponding second training participant; and
- summing the first prediction value sub-vector sum value and the corresponding second prediction value sub-vector sum value from each second training participant to obtain the current prediction value of the regression model for the feature sample set.

20. The computer-implemented system of claim 15, wherein updating the current sub-model of the first training participant comprises:
- updating the current sub-model of the first training participant based on a following equation:

$$W_{n+1} = W_B - \alpha \cdot X_i \cdot e,$$

wherein $W_{n+1}$ represents the updated current sub-model of the first training participant, $W_n$ represents the current sub-model of the first training participant, $\alpha$ represents a learning rate, $X_i$ represents the corresponding feature sample subset of the first training participant, and e represents the prediction difference.

* * * * *